United States Patent [19]

Vossbrinck et al.

[11] Patent Number: 4,831,702
[45] Date of Patent: May 23, 1989

[54] METHOD FOR FIXING BOILER TUBES DURING REPLACEMENT OF SAME

[75] Inventors: Craig R. J. Vossbrinck; David A. Vossbrinck, both of Santa Cruz, Calif.

[73] Assignee: Torque & Tension Equipment, Inc., Santa Clara, Calif.

[21] Appl. No.: 158,747

[22] Filed: Feb. 22, 1988

Related U.S. Application Data

[62] Division of Ser. No. 923,568, Oct. 27, 1986.

[51] Int. Cl.$^4$ ............... B21D 53/02; B23P 15/26
[52] U.S. Cl. .................... 29/157.3 L; 29/157.3 R; 29/157.4; 29/426.4; 29/426.6; 29/727; 72/393
[58] Field of Search ............ 29/726, 727, 151.3 L, 29/157.4 R, 426.4, 426.1, 426.6, 33 T, 235, 255, 244, 282, 157.3 R; 72/392, 393

[56] References Cited

U.S. PATENT DOCUMENTS

| | | | |
|---|---|---|---|
| 2,444,601 | 7/1948 | Hansen | 153/80 |
| 3,986,383 | 10/1976 | Petteys | 72/393 |
| 4,262,518 | 4/1981 | Creger et al. | 72/393 |
| 4,263,713 | 4/1981 | Smith et al. | 29/727 |
| 4,308,736 | 1/1982 | Lowe et al. | 72/36 |
| 4,571,802 | 2/1986 | Calhoun et al. | 29/244 |
| 4,696,102 | 9/1987 | Overbay | 29/282 |
| 4,724,608 | 2/1988 | Parrott | 29/282 |
| 4,746,158 | 5/1988 | Fields | 29/157.3 R |

Primary Examiner—Howard N. Goldberg
Assistant Examiner—Irene Cuda
Attorney, Agent, or Firm—Jack M. Wiseman

[57] ABSTRACT

A method and apparatus for facilitating removal of spent tubes from boilers or heat exchangers in environments where access to one side of the wall through which the tube extends is limited. The apparatus includes a jaw assembly that is movable between a retracted position, at which it can be introduced within a tube to be removed, and an expanded position, at which it radially expands the tube so as to prevent longitudinal movement of the tube. The jaw assembly can be manipulated between the retracted and expanded positions solely through the tube interior so that a worker stationed at a proximal end of the tube to be removed can move the jaw assembly to the expanded position at which the distal end of the tube is fixed against longitudinal movement. After application of pulling forces to fracture the tube, the jaw assembly can be disengaged solely by access through the tube from the proximal end, whereby efficiency of tube removal in environments of limited access is materially enchanced.

4 Claims, 3 Drawing Sheets

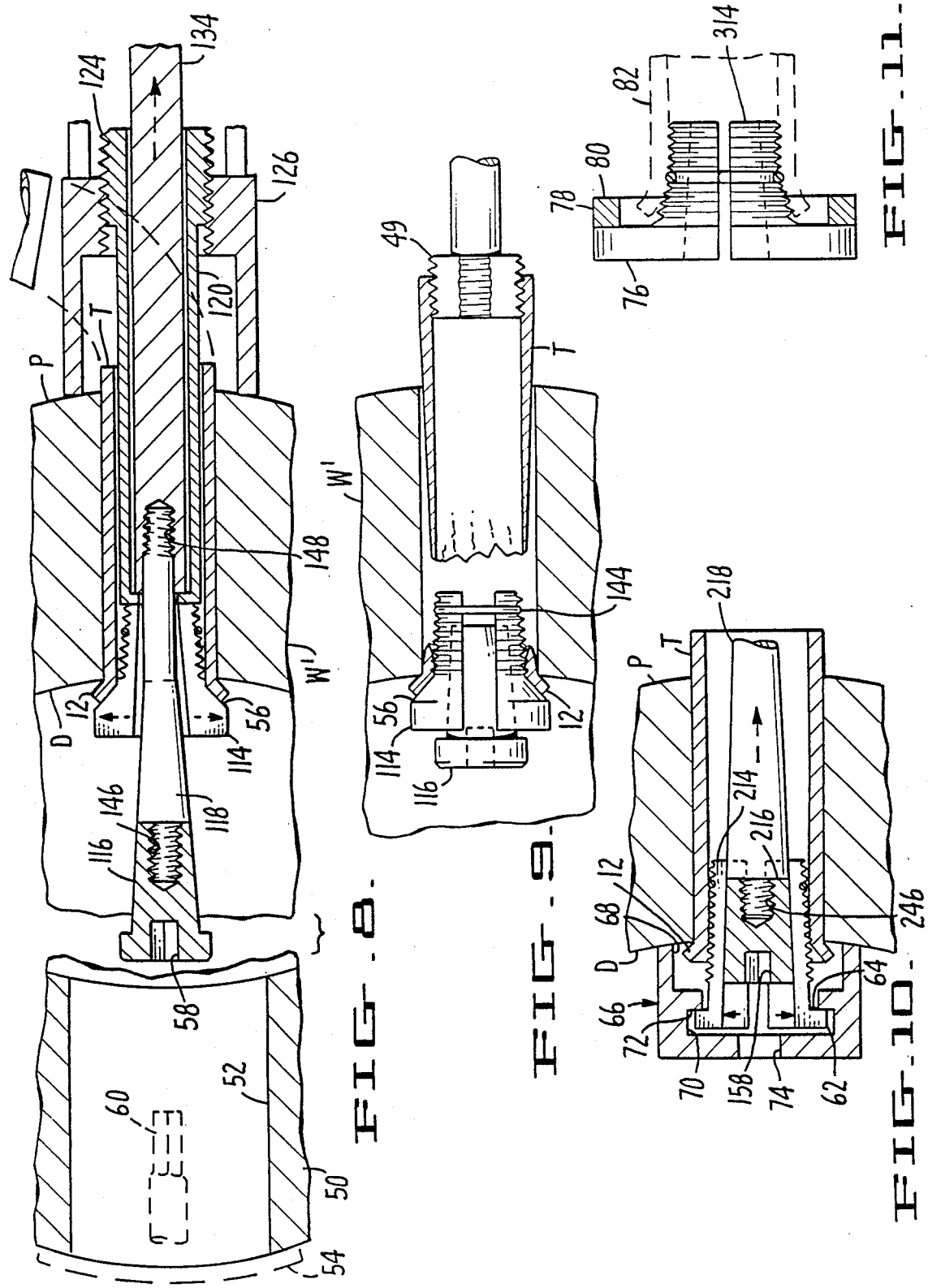

METHOD FOR FIXING BOILER TUBES DURING REPLACEMENT OF SAME

RELATED APPLICATION

This application is a divisional application of our pending application, Ser. No. 06/923,568, filed on Oct. 27, 1986, for Method And Apparatus For Fixing Boiler Tubes And The Like During Replacement Of Same.

BACKGROUND OF THE INVENTION

1. Field of the Invention

This invention relates to method and apparatus for fixing one end of a boiler tube that is tightly retained in an apertured wall preparatory to pulling the tube during replacement thereof.

2. Description of the Prior Art

Tubes of relatively small diameter are widely used in boilers and in heat exchangers to increase the surface area across which heat is transferred during operation of such devices. In the case of boilers there is typically a massive wall, and in heat exchangers there are two or more tube sheets; these walls or sheets are substantial, permanent structures and are provided with numerous passages through which tubes of relatively small diameter are disposed. The tubes have a life that is shorter than the permanent structures in which they are installed so that replacement of the tubes at periodic intervals is common practice.

Because the tubes are tightly mounted within the passages, their removal is a non-trivial task. One technique that has been previously employed involves gripping the tube and applying sufficient longitudinal force to pull the tube from the passage in which it resides. As the tube slides along the passage, longitudinal striations are created in the passage surface; such striations form leak paths after installation of new tubes and consequent degradation of the efficiency of the device. In cases where a boiler wall or tube sheet is formed of alloys, pieces of the wall or tube sheet are liable to break away during such pulling so as to require replacement or extensive repair of the boiler wall or tube sheet.

The foregoing problems resulted in development of a technique that involves clamping the tube at one side of the boiler wall or tube sheet, gripping the other end of the tube, and applying tensile force to the tube. As the tube begins to fail, it elongates and reduces diameter so that when the tube finally fails in response to the tensile force, it diameter is sufficiently small that no damage is done to the portion of the boiler wall or tube sheet that defines the aperture or passage in which the tube is installed.

Typical practice requires two workers to effect removal of the tubes, one working on each side of the boiler wall or tube sheet. In addition to requiring more manhours, this prior art technique often requires access to virtually unaccessible chambers, in consequence of which great difficulty is experienced and the integrity of the portion of the boiler wall that defines the passage is jeopardized.

SUMMARY OF THE INVENTION

According to the present invention a jaw assembly composed of plural segments is provided. The jaw assembly can be retracted and expanded in a radial direction. In the retracted position the overall diameter of the jaw assembly is such as to fit through a tube so that a worker located a the proximal side of a boiler wall can employ an implement to pass the jaw assembly through the tube opening and position the jaw assembly in alignment with the distal wall of the boiler wall or tube sheet. At such position the jaw assembly is expanded, solely by access through the tube interior in order to fix the distal end of the tube to the boiler wall or tube sheet. Then a portion of the implement required to so expand the jaw assembly is removed, a conventional gripping device is threaded into the tube adjacent the proximal side, and pulling by means of conventional hydraulic devices or the like can proceed without requiring a worker on the distal side of the boiler wall or tube sheet. After the tube fails in response to the great tensile force applied thereto, the part of the tube to which the jaw assembly is connected can be tapped through to the distal side at which it falls to the bottom of the volume in which it is contained. The jaw assembly can then be easily recovered for reuse.

The principal object of the invention is to provide method and apparatus which is capable of fixing a tube at the distal side of a boiler wall or tube sheet by manipulation of the device solely through the central passage of the tube. In one form of the invention the jaw assembly is moved to the retracted position, moved through the tube to the distal side, and then expanded. In another form of the invention, useful where at least limited access to the distal side can be had, the jaw assembly can be positioned at the distal side and then engaged and manipulated by a mandrel passed through the tube by a workman on the proximal side of the boiler wall or tube sheet.

The foregoing together with other objects, features, and advantages will be more apparent after referring to the following specification and the accompanying drawings.

BRIEF DESCRIPTION OF THE DRAWINGS

FIG. 8 is an elevation in cross section of an alternate form of the invention.

FIG. 9 is a view of the form of the invention of FIG. 8 immediately after the tube has failed in response to tensile forces.

FIG. 10 is a sectional view of another alternate form of the invention.

FIG. 11 is a sectional view of still another alternate form of the invention.

DETAILED DESCRIPTION OF THE PREFERRED EMBODIMENTS

Figure 1:
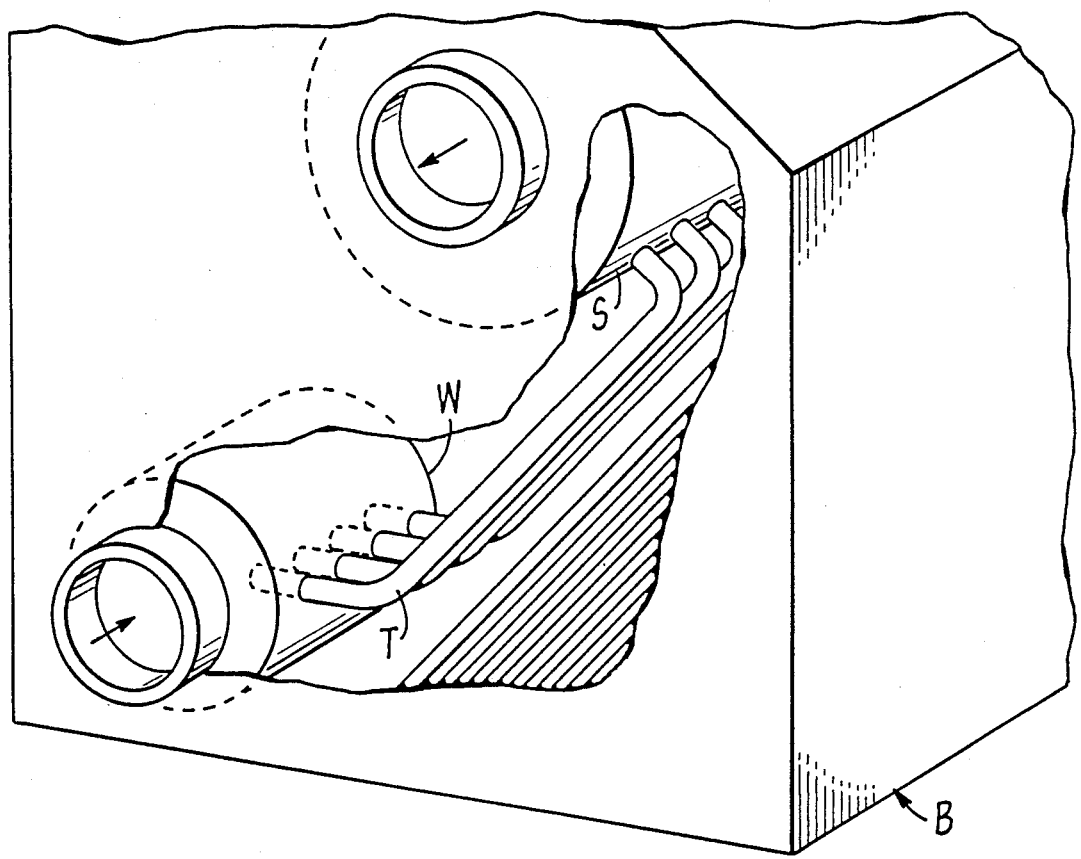
FIG. 1 is a fragmentary perspective view of a steam boiler which illustrates a typical environment in which the invention is particularly useful.

Referring more particularly to the drawings and to FIG. 1, which illustrates one exemplary environment in which the invention finds use, there is a steam boiler assembly B within which a water drum W is mounted in the lower region of the boiler and a steam drum S is located in the upper region of the boiler. Extending between water drum W and steam drum S is a plurality of boiler tubes T. The region within boiler B exterior of tubes T is typically filled with flame, and water introduced to water drum W flows through the tubes and is converted by the flame to steam which is collected in steam drum S. Water drum W and steam drum S are typically relatively thick-walled members and have a virtually unlimited life. In contrast, tubes T are relatively thin-walled and because they are subjected to extremely high temperatures during use, have a relatively limited life. Conventional practice is to replace tubes T periodically, and the present invention is adapted to facilitate such replacement.

The fit between the external surface of tubes T and the passages in the walls of the water and steam drums is an extremely tight one. The tightness arises because during installation of the tubes in the drum wall passages, the tubes are expanded, and because over the course of time, the extreme temperatures present within the structure contribute further to the tightness. Of extreme importance when spent tubes are removed in avoidance of damage to the walls that define the passages in the drum walls. A known technique for effecting removal of the tubes without damaging the drum wall passages is to fix one end of the tube, insert a tube gripper into the other end, and apply tensile force to the gripper. As the tube stretches prior to failure, its diameter contracts so that on failure, the tube is parted without abrading the wall that defines the passage in which the tube resides. This technique is impracticable, however, where space for installation of the clamp is limited.

In removing boiler tubes as described above it is essential that one end of the tube be firmly fixed with respect to the boiler way. Typical prior art practice involves using two workers, one on each side of a boiler wall. The worker who will ultimately do the pulling is stationed on the proximal side and the worker who will attend to fixing the opposite end of the tube is deployed on the distal side. Such practice is not only inefficient but can be extremely difficult for one or the other worker where space is limited or access is impossible.

In the foregoing introductory remarks regarding the environment in which the present invention finds particular application, the specification of a boiler is only by way of example because the invention finds application in any environment where tubes must be removed from tight engagement with a passage through a member. For example, heat exchangers have tube sheets which coact with the tubes installed therein in a manner analogous to that described above in connection with boilers. In the ensuing discussion the use of the term boiler wall should be construed as the equivalent of a heat exchanger tube sheet or any solid body that defines a passage in which a tube is tightly disposed and from which the tube is to be removed without damaging the surface of the passage.

Figure 2:
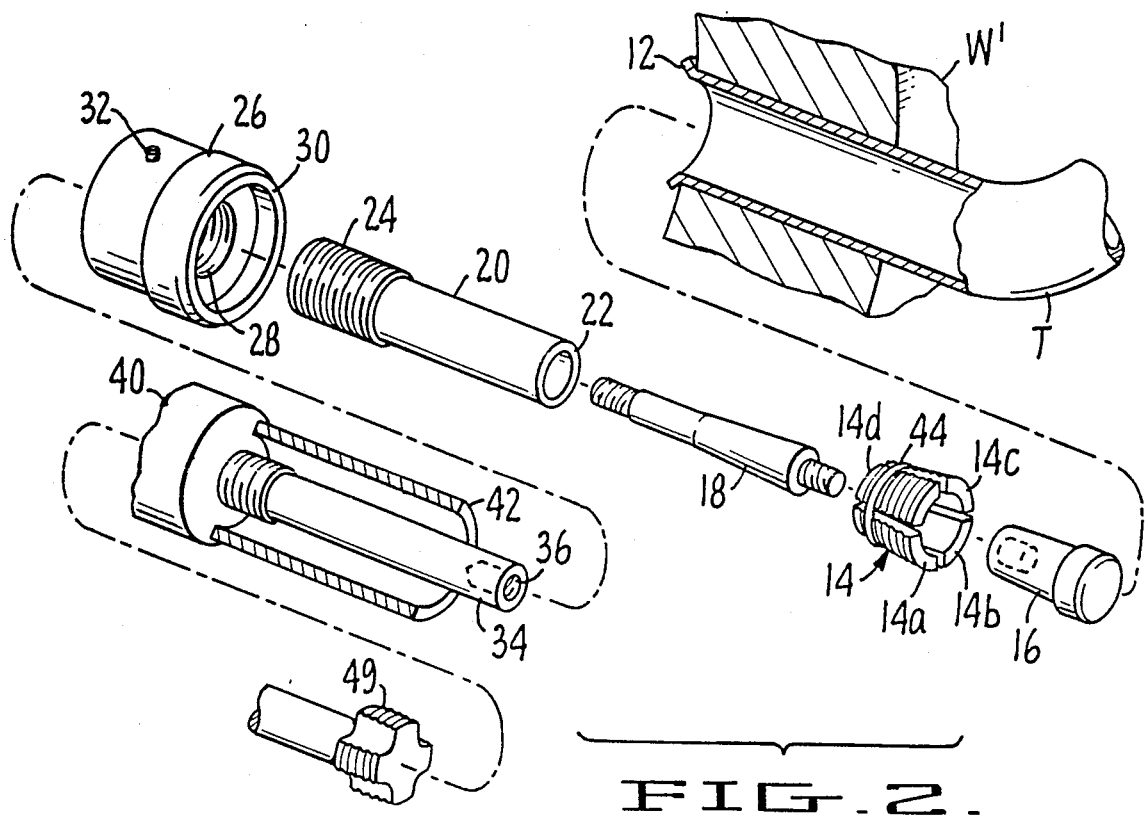
FIG. 2 is an exploded view of apparatus according to the invention as well as known pulling apparatus which forms no part of the invention per se but is shown in the interest of completeness.

Referring to FIG. 2, a fragment of a boiler wall is indicated at W'. A tube T is tightly installed within a passage formed in Wall W'. At the left-hand end of the wall fragment as viewed in FIG. 2, referred to hereinafter as the proximal side of the all, the tube is flared as indicated at 12. Tube T at the opposite or distal side extends to some other similar wall in the manner shown in FIG. 1. According to the invention there is a jaw assembly 14, the details of which are described hereinbelow, which can be retracted to a diameter such as to pass through tube T from the proximal side of wall W'. A jaw expander 16 extends through the interior of jaw assembly 14 and coacts with the jaw assembly to expand the jaws outward into engagement with the interior of tube T. Adapted for engagement with the expander is a tapered mandrel 18 which has a length sufficient to afford retraction of that jaw assembly 14 so that the jaw assembly can be positioned within tube T.

A hollow reaction tube 20 is provided. The reaction tube has an inside diameter sufficient to afford the free passage of mandrel 18 therethrough and a length sufficient to extend through the passage in wall W' and bear against the end of jaw assembly 14; the reaction tube defines an annular abutment surface 22 for the latter purpose. The end of reaction tube 20 opposite the annular abutment surface is externally threaded at 24. A retaining nut 26 has an internally threaded bore 28 adapted for threaded engagement with the threaded portion 24 of the reaction tube. Retaining nut 26 also defines an annular abutment surface 30 adapted to bear against the proximal surface of wall W'. The inner diameter of annular abutment surface 30 is sufficient to clear flare 12 of the boiler tube. Extending radially to the inner surface of threaded bore 28 is a set screw 32 which is employed to lock the retaining nut to the reaction tube at a position such that when annular abutment surface 30 rests against the proximal surface of boiler wall W', contact between reaction tube abutment surface 22 and jaw assembly 14 positions the jaw assembly in alignment with the distal surface of the boiler wall. A straight mandrel 34 is provided with a longitudinally extending internally threaded opening 36 for engagement with complemental threads on mandrel 18. The opposite end of straight mandrel 34 is engaged with a commercially available pulling mechanism 40 which forms no part of the invention. Suffice it to say for the present disclosure, pulling mechanism 40 is typically hydraulically powered so as to draw mandrel 34 outward (to the left as viewed in FIG. 2), in respect to an extension sleeve 42 which bears against the end of retaining nut 26 opposite from annular abutment surface 30 so as to keep the retaining nut and reaction tube 20 in place as tensile force in the leftward direction on mandrel 34 is applied by the mechanism.

Figures 5, 6:
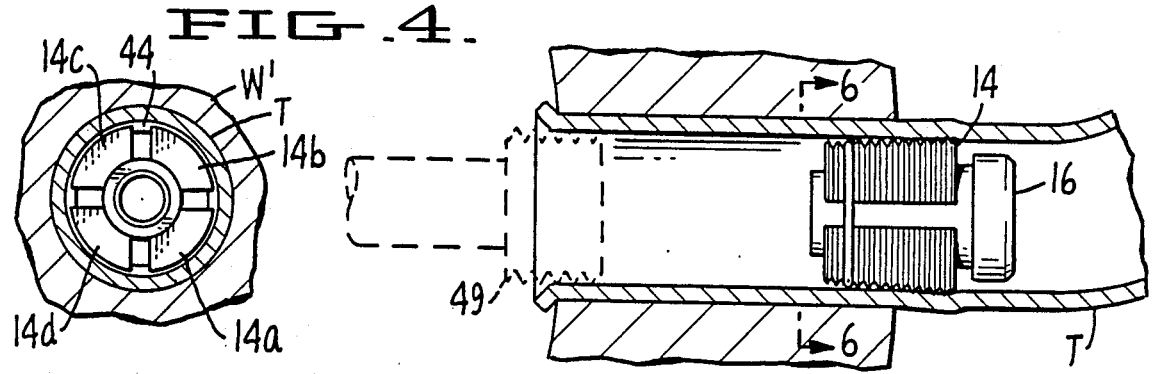
FIG. 5 is a view shown with the expansion mandrel removed and a tube wall gripping member, shown in broken lines, in place within the tube.
FIG. 6 is a cross-sectional view taken on line 6—6 of FIG. 5.

As can be seen in FIGS. 2 and 6, jaw assembly 14 includes four substantially identical segments 14a, 14b, 14c, and 14d. The segments are circumferentiallylimited so as to afford movement of the segments to a retracted position at which the jaw assembly can be introduced interiorly of tube T. The segments have tapered exterior surfaces on which are formed sharp ridges 43 (FIG. 3) so that as the jaws are expanded, the ridges deform the inner surface of the tube and provide firm engagement between the jaw assembly and the tubes. The exterior surfaces of the jaw segments are also formed with a circumferential groove in which an elastic retaining ring 44 is disposed. The retaining ring serves to retain the jaw segments in assembled condition on jaw expander 16 and tapered mandrel 18.

Figure 3:
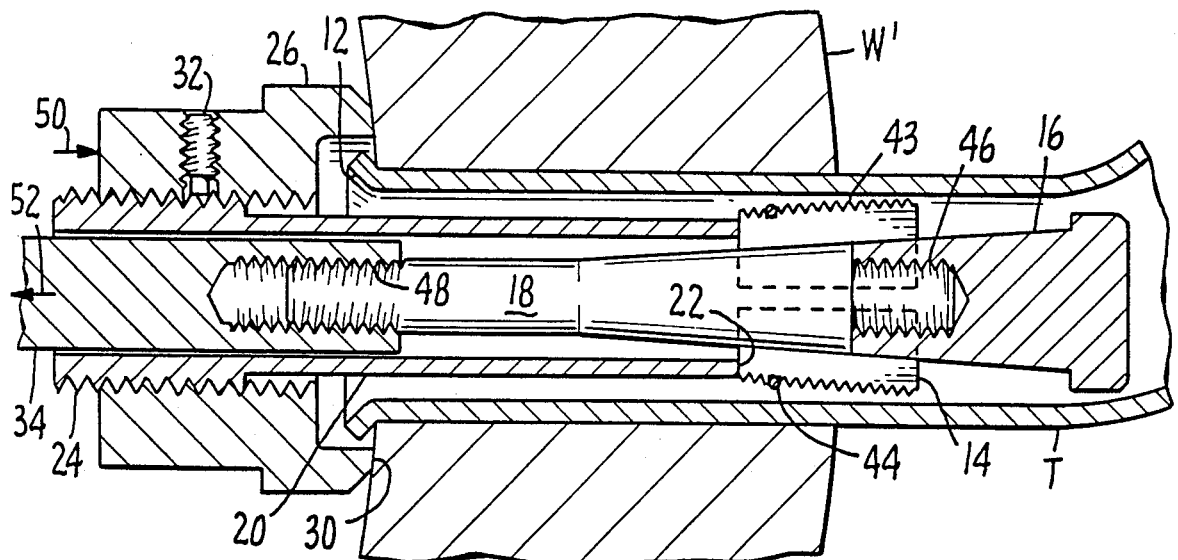
FIG. 3 is an elevation view in cross section of apparatus according to the invention positioned in a tube and disposed in the retracted position.

Installation of one device constructed in accordance with the invention will be described in connection with FIG. 3 and the use of the device will be described in connection with FIGS. 4–7. In FIG. 3 jaw assembly 14 is seen in a retracted position at which the outer dimension of the assembly is such as to afford insertion from the proximal side through the interior of the tube to a position at which the jaw assembly is at the distal side of wall W'. To so establish such position of the jaw assembly, retaining nut 26 is threaded along threaded portion 24 of reaction tube 20 so that when the annular abutment surface of the reaction tube, the rightward extremity as viewed in FIG. 3, bears against jaw assembly 14 and abutment surface 30 of nut 26 bears on the proximal surface of the wall, the jaw assembly is positioned correctly. The relative position of retaining nut 26 and the reaction tube is preserved by tightening set screw 32 after the correct position has been established. Before insertion of the apparatus into tube T, jaw expander 16 is threaded onto tapered mandrel 18 at a threaded joint 46. Also, mandrel 18 is threaded into pulling mandrel 34 at a threaded joint 48. For reasons described below, the threads are of opposite sense.

Jaws assembly 14 is positioned toward the relatively small diameter of tapered mandrel 18 so that the jaw assembly resides in the retracted position at which the outermost dimension of the jaw assembly is less than the inner diameter of tube T. The apparatus can then be introduced into tube T to the position seen in FIG. 3. Next, tension applying mechanism 40 is coupled to the apparatus and is activated. The mechanism applies a relative force between the parts indicated by an arrow 50 which tends to position retaining nut 26 against the proximal surface of the wall so as to hold jaw assembly 14 in the correct position and an arrow 52 which draws expander 16 into the complementally tapered central core of jaw assembly 14 so as to cause expansion of the jaw segments of the assembly. Ultimately, the jaws are expanded to the position seen in FIG. 4 after jaw assembly actuator 16 has been drawn sufficiently into the central tapered bore of jaw assembly. As seen in the latter figure, the walls of tube T are expanded outward so that tube T at the distal wall surface has an outside diameter greater than the inside diameter of the passage through wall W'. At such position, movement of the tube within the wall passage toward the distal side of the wall is virtually impossible. Next, a suitable turning tool is attached to the accessible end of pulling mandrel 34 and the mandrel is rotated in a direction to unthread the connection at threaded portion 46. Because threads 48 are formed at an opposite sense, such rotation of the pulling mandrel avoids disengagement of those threads.

Figure 4:
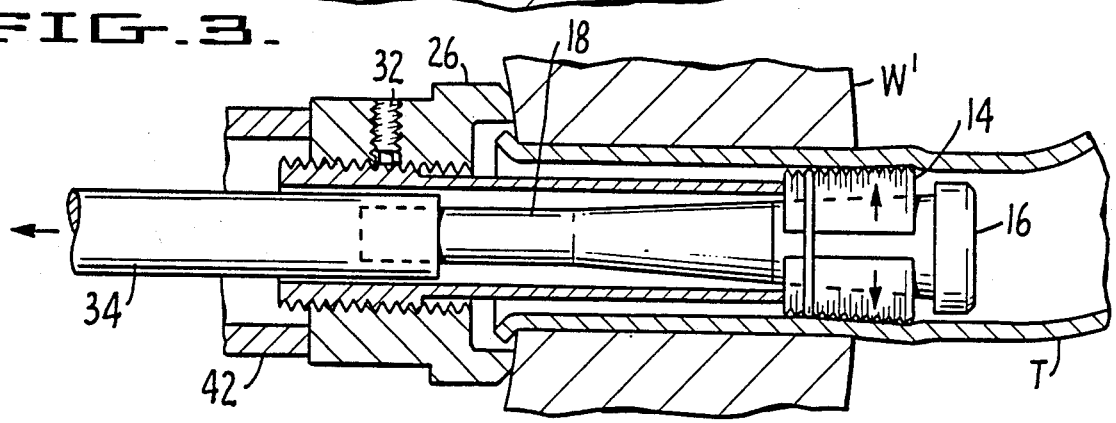
FIG. 4 is a view similar to FIG. 3 showing the jaw assembly in an expanded condition.

After pulling mandrel 34 and tapered mandrel 18 have been removed, jaw assembly 14 and jaw assembly expander 16 reside in the position seen in FIG. 4, a position at which the jaw assembly is substantially confined adjacent the distal extremity of the passage and at which the remainder of the interior of tube T is accessible. The degree of taper of the internal opening of jaw assembly 14 and the externals surface of jaw expander 16 are such as to form a sticking taper. In this context, a sticking taper means a taper that satisfactorily expands the individual jaw segments of the jaw assembly when the expander is moved in a leftward direction as viewed in the drawings and will remain in that position after the tension is removed from pulling mandrel 34 and tapered mandrel 18. In one apparatus designed in accordance with the invention an included angle of abut six degrees has been found to afford the requisite sticking taper.

With the distal extremity of the tube fixed as described above, threaded engaging tool 49 is installed in the interior of tube T from the proximal end thereof. The tool, a known article of commerce, is of tap-like configuration so that it can cut threads on the internal surface of tube T as it is rotated thereinto. After the tool 49 is firmly engaged to the inner wall of tube T, tension applying mechanism 40 is connected to draw the tool and the portion of tube T within the boiler wall passage outward in the direction of the arrow seen in FIG. 7. As the force is continued, the portion of tube T within the wall passage begins to elongate or stretch and in doing so effects a reduction in diameter. By the time the tensile force applied to the tube exceeds the strength of the material of which the tube is made, the outer diameter of the tube within the wall passage is reduced so that on failure of the tube, seen in FIG. 7, contact between the outer tube surface and the wall passage is virtually nonexistent in consequence of which the tube is removed without adversely affecting the passage surface.

Figure 7:
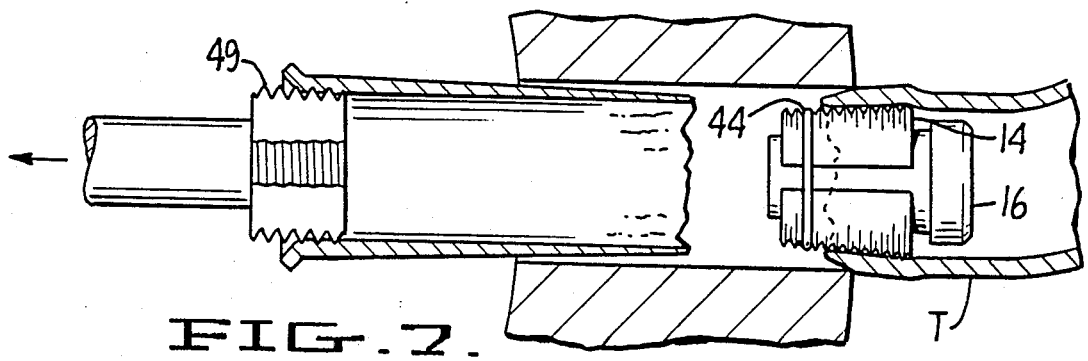
FIG. 7 is a view showing the tube immediately after it has failed in response to tensile force and further showing the reduction in diameter of the tube.

Upon failure of the tube and removal of tension applying tool 40 and the part of the tube at the left, as viewed in FIG. 7, tapered mandrel 18 and straight mandrel 34 are reinstalled so that the tapered mandrel is engaged with jaw expander 16 at threaded joint 46. Then inward force on the mandrels and the jaw expander is applied to move the jaw expander rightward as viewed in FIGS. 3, 4, 5, and 7 and out of engagement with jaw assembly 14. This permits the energy stored in elastic retaining ring 44 to move jaw segments 14a–14b to a retracted position free of the inner surface of tube T, after which the mandrels 18 and 34, jaw assembly 14, and jaw expander 16 can be removed from the distal side of wall W'.

In the usage of the invention described immediately above and as seen most clearly in FIG. 3, tube T is flared at 12 and the inner diameter of the opening in retaining nut 26 is sufficient to clear the flare so that annular abutment surface 30 of the retaining nut can bear against the wall at the proximal end of the tube passage. There are many installations of boilers, heat exchangers, and like apparatus where relatively convenient access can be had to the side of the wall at which the flare 12 is present. In certain installations, however, access to the side of the wall at which the tube flare is less convenient than access to the other side. For example, there are certain highly compact installations where access to the flared side can be had only through hand holes which are not necessarily aligned with the tube to permit extraction of the tube as has been described previously in connection with FIGS. 3–7. Modifications of the invention permit utilization of the invention in such compact installations.

Referring to FIG. 8, a wall such as a boiler wall is indicated at W'. Spaced from the side of the wall at which tube flare 12 is positioned is a second wall 50 which contains hand holes or inspection ports one of the which is shown at 52. Hand holes 50 is covered by a removable cover 54 during usage of the boiler or heat exchanger of which it is a part; the cover 54 can be removed during maintenance. Because many of the parts of the embodiment of the invention of FIG. 8 are similar to those referred to previously, reference numerals greater by 100 than those previously used are employed in FIG. 8. There is a jaw assembly indicated at 114 with which a jaw expander 116 coacts. For threaded connection with expander 116 is a tapered mandrel 118 which in turn is adapted for thread engagement with a pulling mandrel 134. A reaction tube 120 has a treaded portion 124 with which a retaining nut 126 is engaged.

The specific configuration of jaw assembly 114 is different from that previously described in that its outer extremity is provided with a beveled shoulder 56 opposite sides of which include an angle such as to engage the inner surface of tube flare 12 and effect firm retention and deformation or partial flattening of the flare against the distal surface D of the wall in which tube T is installed.

In using a device of the form exemplified by FIG. 8, jaw assembly 114 and jaw expander 116 are assembled and manually held in an assembled condition by a worker positioned at the external side, the left-hand side as viewed in FIG. 8, of wall 50. The worker then introduces the jaw assembly and expander through inspection port 52 into position at which tapered surface 56 rests against tube flare 12. The outer axial extremity of expander 116 is provided with a non-circular opening 58, such as a hexagonal shaped opening, so that the worker on the outer side of wall 50 can prevent the expander from rotating by engagement with an Allen wrench or the like shown in broken lines at 60. Another worker stationed at the proximal surface of wall W', after having first severed the portion of tube T indicated by broken lines in the figure, introduces tapered mandrel 118 and tension mandrel 134 into the central opening of the tube. Then engagement of threaded connection 148 is achieved by cooperation of the persons positioned as described immediately above. Thereafter, tension is applied to tension mandrel 134 to effect expansion of jaw assembly 114 and fixing of the distal extremity of tube T after which removal of pulling mandrel 134 and tapered mandrel 118 are effected by unthreading the structure at threaded connection 146.

As described previously in connection with FIGS. 3–7, threaded engaging tool 49 is introduced to the interior of tube T and the same steps are repeated to extract the tube from the passage in wall W' without adversely affecting the integrity of the surface that defines the passage. After removal of the main portion of the tube, the portion adjacent the tube flare 12 and jaw assembly 114 and jaw expander 116 can be tapped loose without damage to the passage defining the opening in wall W'.

A further modification illustrating the advantages of the invention is shown in FIG. 10 in which equivalent structures are identified by reference numerals 100 greater than those employed in FIGS. 8 and 9. The modification of FIG. 10 includes a jaw assembly 214 in which the outer extremities of the jaw segments have outwardly extending flared shoulders 62 which form a substantially annular bearing surface 64 on the inner end of the shoulders. A reaction cap 66 is provided with a major inner opening 68 having a diameter sufficiently large to clear taper 12 on tube T. Inward of opening 68, retainer 66 is provided with a cylindric shape undercut 70 which defines an annular bearing surface 72 adapted to cooperate with bearing surface 64 on jaw assembly 214 to prevent longitudinal movement of the jaw assembly in a manner analogous to the function of reaction tube 20 referred to previously in connection with description of the embodiment of FIGS. 1–7.

As in the embodiment described in connection with FIGS. 8 and 9, the embodiment of FIG. 10 is installed by preliminarily assembling tube expander 216, tapered mandrel 218, and retainer 66. Installation progresses as described in connection with FIG. 8, a non-circular gripping member 158 being provided in jaw expander 216 so as to permit engagement of the pulling mandrel, equivalent to that identified at 134 in FIG. 8, so that pulling can proceed. Retainer 66 is provided with an opening 74 for affording access to the non-circular gripping member in jaw expander 216. Because of the coaction between abutment surface 64 on the jaw assembly and abutment surface 72 on the retainer, jaw assembly 214 is confined solely to radial movement during expansion thereof. Expansion affords a firm engagement between the teeth on jaw assembly 214 and the inner wall of tube T and partial deformation of tube flare 12 so that upon unthreading of tapered mandrel 218 at a threaded joint 246, the interior of tube T is accessible for introduction of threaded gripping tool 49 and removal of the tube as previously described.

The modification seen in FIG. 11 achieves the advantages of that seen in FIG. 10 without the necessity for retainer 66. In FIG. 11 is seen a jaw assembly 314 on the outer end of which is an integral outward extending flange 76. Rigid with or integral with the flange is an annular ring 78 having a bearing surface 80 adapted to bear on the distal surface of the wall in which a tube to be removed is installed. The construction of the expander used in connection with the embodiment of FIG. 11 is substantially identical to that seen in FIG. 10 except for the elimination of a separate reaction member. Because the installation and use of the embodiment of FIG. 11 is virtually identical to that described in connection with FIG. 10, no further description of same is needed here.

In the embodiments described herein, the external ridged surface of jaw assembly 14 of FIG. 3 (and its counterparts in the other figures) is tapered, the proximal end of the ridged surface having a diameter smaller than that of the distal end of the surface. This configuration functions to assure good engagement by the smaller diameter end with the internal surface of the tube and to assure that the portion of the tube beyond the distal surface of the wall in which the tube resides is expanded so that outer diameter of the tube exceeds the inner diameter of the wall passage from which the tube is to be extracted.

Thus, it will be seen that the present invention provides apparatus for expediting removal of boiler tubes without jeopardizing the surface of the passage in which the tube is installed. This is achieved because the invention affords apparatus for fixing the tube at the distal surface of the wall in which it resides so that a worker positioned at the proximal surface of the wall can effect extraction of the tube as has been described. Not only does use of the invention reduce or eliminate damage to the wall passage in which the tube is installed, it materially expedites removal of the tube.

Although several embodiments of the invention have been shown and described, it will be apparent that other adaptations and modifications can be made without departing from the true spirit and scope of the invention.

What is claimed is:

1. A method of removing a tube that extends between a proximal extremity and a distal extremity of a passage within which the tube is tightly positioned comprising the steps of:

(a) inserting a radially expandable jaw assembly while retracted in a tube from the proximal extremity of said passage;
(b) positioning said jaw assembly within the tube at the distal extremity of said passage;
(c) expanding said jaw assembly for engagement with a distal end of said tube by actuating a tool having a portion thereof insertable in said tube from the proximal extremity of said passage;
(d) removing said portion of said tool insertable into said tube from the proximal extremity of said passage for greater accessibility to a proximal end of said tube while said jaw assembly remains expanded; and
(e) exerting a pulling force on said tube from the proximal extremity thereof until the portion of the tube at the distal extremity of said passage is fractured for removal.

2. A method of removing a tube as claimed in claim 1 and further comprising the step of tapping the remaining portion of said tube engaged by said jaw assembly at the distal end of said tube.

3. A method of removing a tube as claimed in claim 2 and further comprising the step of recovering said jaw assembly for reuse.

4. A method of removing a tube as claimed in claim 1 and further comprising the step of aligning said jaw assembly with a wall located in the vicinity of the proximal end of said tube by abutment between alignment means and said jaw assembly and abutment between said alignment means and said wall.

* * * * *